(12) United States Patent
Chen et al.

(10) Patent No.: US 11,062,124 B2
(45) Date of Patent: Jul. 13, 2021

(54) FACE POSE DETECTION METHOD, DEVICE AND STORAGE MEDIUM

(71) Applicant: PING AN TECHNOLOGY (SHENZHEN) CO., LTD., Guangdong (CN)

(72) Inventors: Lin Chen, Guangdong (CN); Guohui Zhang, Guangdong (CN)

(73) Assignee: PING AN TECHNOLOGY (SHENZHEN) CO., LTD., Shenzhen (CN)

(*) Notice: Subject to any disclaimer, the term of this patent is extended or adjusted under 35 U.S.C. 154(b) by 70 days.

(21) Appl. No.: 16/632,371

(22) PCT Filed: Oct. 31, 2017

(86) PCT No.: PCT/CN2017/108803
§ 371 (c)(1),
(2) Date: Jan. 19, 2020

(87) PCT Pub. No.: WO2019/033576
PCT Pub. Date: Feb. 21, 2019

(65) Prior Publication Data
US 2020/0226354 A1  Jul. 16, 2020

(30) Foreign Application Priority Data
Aug. 17, 2017 (CN) .......................... 201710707941.2

(51) Int. Cl.
*G06K 9/00* (2006.01)
*G06T 7/73* (2017.01)

(52) U.S. Cl.
CPC ............ *G06K 9/00248* (2013.01); *G06T 7/73* (2017.01); *G06T 2207/30244* (2013.01)

(58) Field of Classification Search
USPC ......................................................... 382/118
See application file for complete search history.

(56) References Cited

U.S. PATENT DOCUMENTS

| | | | |
|---|---|---|---|
| 7,502,494 B2* | 3/2009 | Tafuku | G06K 9/00248 382/118 |
| 2010/0288295 A1* | 11/2010 | Kamada | G06T 11/00 132/200 |
| 2015/0326963 A1* | 11/2015 | Sorensen | H04R 1/1041 381/74 |
| 2016/0299360 A1* | 10/2016 | Fonte | G06T 17/00 |
| 2020/0059596 A1* | 2/2020 | Yoo | H04N 5/23219 |
| 2020/0074148 A1* | 3/2020 | Xu | G06K 9/00308 |
| 2020/0367630 A1* | 11/2020 | Darwinkel | B26B 19/388 |
| 2020/0413190 A1* | 12/2020 | Fujii | H04R 3/005 |
| 2021/0088811 A1* | 3/2021 | Varady | G02C 13/005 |

\* cited by examiner

Primary Examiner — Jerome Grant, II (57) ABSTRACT

The application discloses a face pose detection method, which includes the steps of: extracting N face feature points from a face image through a face detection algorithm; extracting key feature points from the N face feature points; and calculating face pose information such as a rotation direction and a rotation angle of a face around a coordinate axis according to coordinate values of the key feature points. According to the application, a real-time detection of a face pose is realized by calculating the pose information of the face in the face image with the coordinate values of the feature points of the face. Accordingly, the present application also provides a calculating device and a computer-readable storage medium.

20 Claims, 4 Drawing Sheets

FACE POSE DETECTION METHOD, DEVICE AND STORAGE MEDIUM

CLAIM OF PRIORITY

The present patent application is based on and claims the priority of the Chinese invention patent application filed on Aug. 17, 2017 with the application number 201710707941.2 and entitled "Face Pose Detection Method, Device and Storage Medium".

TECHNICAL FIELD

The invention relates to the technical field of computer vision processing, in particular to a face pose detection method, a device and a storage medium.

BACKGROUND

Computer vision processing technology began in the early 1960s, with research in the fields of detection, tracking, recognition, etc. With the rapid development of computer and network technology, computer vision processing technology has been widely used in many important fields of industrial detection, safety monitoring, clinical diagnosis and treatment, transportation, entertainment, military, etc. The computer face pose detection technology can be used for intelligent systems such as auxiliary driving, man-machine interaction and the like, and has wide application prospect.

The traditional face pose detection system directly trains sample data of faces in different poses through deep learning, and then judges the face poses with the trained model. However, according to the detection method, a large number of samples are needed, accuracy is poor, and only the trained poses instead of all the face poses can be detected.

SUMMARY

The invention provides a face pose detection method, a device and a storage medium, and mainly aims to calculate face pose information according to coordinate values of key feature points of a face, improve the speed and accuracy of face pose detection and realize face pose detection at any angle.

In order to achieve the above object, the application provides a face pose detection method, which includes the steps of:

face feature points extraction step: extracting N face feature points from a face image through a face detection algorithm;

key feature points extraction step: extracting a first feature point close to an upper part of a right ear, a second feature point close to a lower part of the right ear, a third feature point close to the lower part of a left ear and a fourth feature point close to the upper part of the left ear among the facial contour feature points from the N face feature points, and extracting a nose tip feature point as a fifth feature point;

a first calculation step: forming a first vector by the fifth feature point and the first feature point, forming a second vector by the fifth feature point and the fourth feature point, calculating a first included angle between the first vector and the second vector, and judging a rotation angle of a face around an X axis in the face image according to a change of the first included angle and an initial included angle;

a second calculation step: forming a third vector by the first feature point and the fourth feature point, leading out a straight line L1 parallel to the X axis from the fourth feature point, calculating a second included angle between the third vector and the straight line L1, and judging the rotation angle of a face around a Y axis in the face image according to the second included angle;

a third calculation step: recording the distance between the second feature point and the fifth feature point as a first distance, recording the distance between the third feature point and the fifth feature point as a second distance, calculating a ratio of the first distance to the second distance, and judging a rotation direction of the face around a Z axis in the face image according to the ratio of the first distance to the second distance.

In order to achieve the above object, the application also provides a calculating device which includes a camera device, a memory and a processor, wherein the memory includes a face pose detection program, and the face pose detection program follows the steps when executed by the processor:

face feature points extraction step: extracting N face feature points from a face image through a face detection algorithm;

key feature points extraction step: extracting a first feature point close to an upper part of a right ear, a second feature point close to a lower part of the right ear, a third feature point close to the lower part of a left ear and a fourth feature point close to the upper part of the left ear among the facial contour feature points from the N face feature points, and extracting a nose tip feature point as a fifth feature point;

a first calculation step: forming a first vector by the fifth feature point and the first feature point, forming a second vector by the fifth feature point and the fourth feature point, calculating a first included angle between the first vector and the second vector, and judging a rotation angle of a face around an X axis in the face image according to a change of the first included angle and an initial included angle;

a second calculation step: forming a third vector by the first feature point and the fourth feature point, leading out a straight line L1 parallel to the X axis from the fourth feature point, calculating a second included angle between the third vector and the straight line L1, and judging the rotation angle of a face around a Y axis in the face image according to the second included angle;

a third calculation step: recording the distance between the second feature point and the fifth feature point as a first distance, recording the distance between the third feature point and the fifth feature point as a second distance, calculating a ratio of the first distance to the second distance, and judging a rotation direction of the face around a Z axis in the face image according to the ratio of the first distance to the second distance.

In addition, to achieve the above object, the present application also provides a computer-readable storage medium including a face pose detection program. Any step in the face pose detection method is realized when the face pose detection program is executed by the processor.

According to the face pose detection method, device and computer-readable storage medium, the key feature points of the face are extracted, the pose information such as the rotation angle of the face is calculated according to the coordinate values of the key feature points, so that the speed and the accuracy of the face pose detection are improved, and the face pose detection at any angle is realized.

The accomplishment, functional features and advantages of the objects of the present application will be further described with reference to the embodiments, and with reference to the accompanying drawings.

DETAILED DESCRIPTION OF ILLUSTRATED EMBODIMENTS

It should be understood that the specific embodiments described herein are merely illustrative of the present application and are not intended to be limiting thereof.

Figure 1:
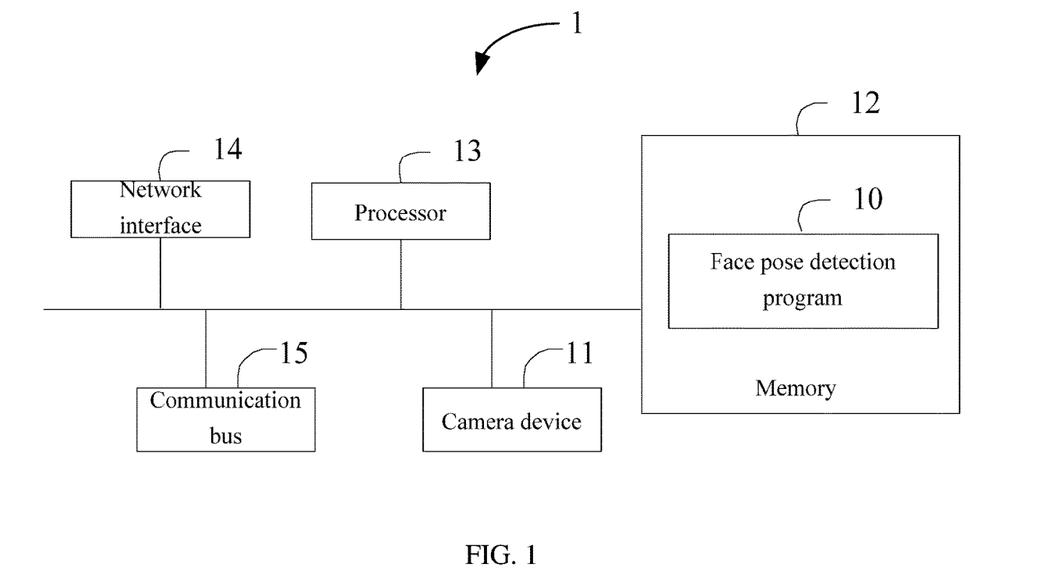
FIG. 1 is a schematic diagram of the operating environment of a preferred embodiment of the calculating device of the present application.

Referring to FIG. 1, a schematic diagram of the operating environment of a preferred embodiment of the calculating device 1 of the present application is shown.

The calculating device 1 may be a terminal device having an operation function, such as a server, a smart phone, a tablet computer, a portable computer, a desktop computer, etc.

Referring to FIG. 1, the calculating device 1 includes a camera device 11, a memory 12, a processor 13, a network interface 14, and a communication bus 15. The camera device 11 is installed in a special place, such as an office, a monitoring area and an intelligent automobile cab, a target entering the special place is captured in real time to obtain a real-time image, and the captured real-time image is transmitted to the processor 13 through a network. The network interface 14 may optionally include a standard wired interface, and a wireless interface (e.g., a WI-FI interface). A communication bus 15 is used for enabling connecting communication between these components.

The memory 12 includes at least one kind of readable storage medium. The at least one kind of readable storage medium may be a non-volatile storage medium such as flash memory, hard disk, multimedia card, card-type memory, etc. In some embodiments, the readable storage medium may be an internal storage unit of the calculating device 1, such as a hard disk of the calculating device 1. In other embodiments, the readable storage medium may also be an external memory of the calculating device 1, such as a plug-in hard disk, a Smart Media Card (SMC), a Secure Digital (SD) card, a Flash Card, etc., provided on the calculating device 1.

In the embodiment, the readable storage medium of the memory 12 is generally used for storing a face pose detection program 10 installed in the calculating device 1, a real-time image obtained by the camera device 11, a face image, initial data, etc. The memory 12 may also be used for temporarily storing data that has been or will be output.

Processor 13, which in some embodiments may be a central processing unit (CPU), microprocessor or other data processing chip, is used for operating program code or processed data stored in the memory 12, such as to execute face pose detection program 10, etc.

FIG. 1 only shows a calculating device 1 having components 11-15 and a face pose detection program 10, but it is to be understood that not all illustrated components need to be implemented, but that more or fewer components may optionally be implemented.

Optionally, the calculating device 1 may further include a user interface which may include an input unit such as a Keyboard, a voice input device such as a microphone and the like having a voice recognition function, a voice output device such as a sound, an earphone and the like, and optionally, the user interface may further include a standard wired interface and a wireless interface.

Optionally, the calculating device 1 may also include a display, which may also suitably be referred to as a display screen or display unit, and in some embodiments might be LED displays, liquid crystal displays, touch-sensitive liquid crystal displays, and OLED (Organic Light-Emitting Diode) touchers. The display is for displaying information processed in the calculating device 1 and for displaying a visual user interface.

Optionally, the calculating device 1 further includes a touch sensor. The area provided by the touch sensor for a user to perform a touch operation is called a touch area. Further, the touch sensor described herein may be a resistive touch sensor, a capacitive touch sensor, etc. Furthermore, the touch sensor may include not only a touch sensor of a touch type, but also a touch sensor of a proximity type, etc. Furthermore, the touch sensor may be a single sensor or a plurality of sensors arranged, for example, in an array.

Furthermore, the area of the display of the calculating device 1 may or may not be the same as the area of the touch sensor. Optionally, a display is stacked with the touch sensor to form a touch display screen. The calculating device detects a touch operation triggered by a user based on a touch display screen.

Optionally, the calculating device 1 may further include RF (Radio Frequency) circuitry, sensors, audio circuitry, etc., which will not be described in detail herein.

Figure 3:
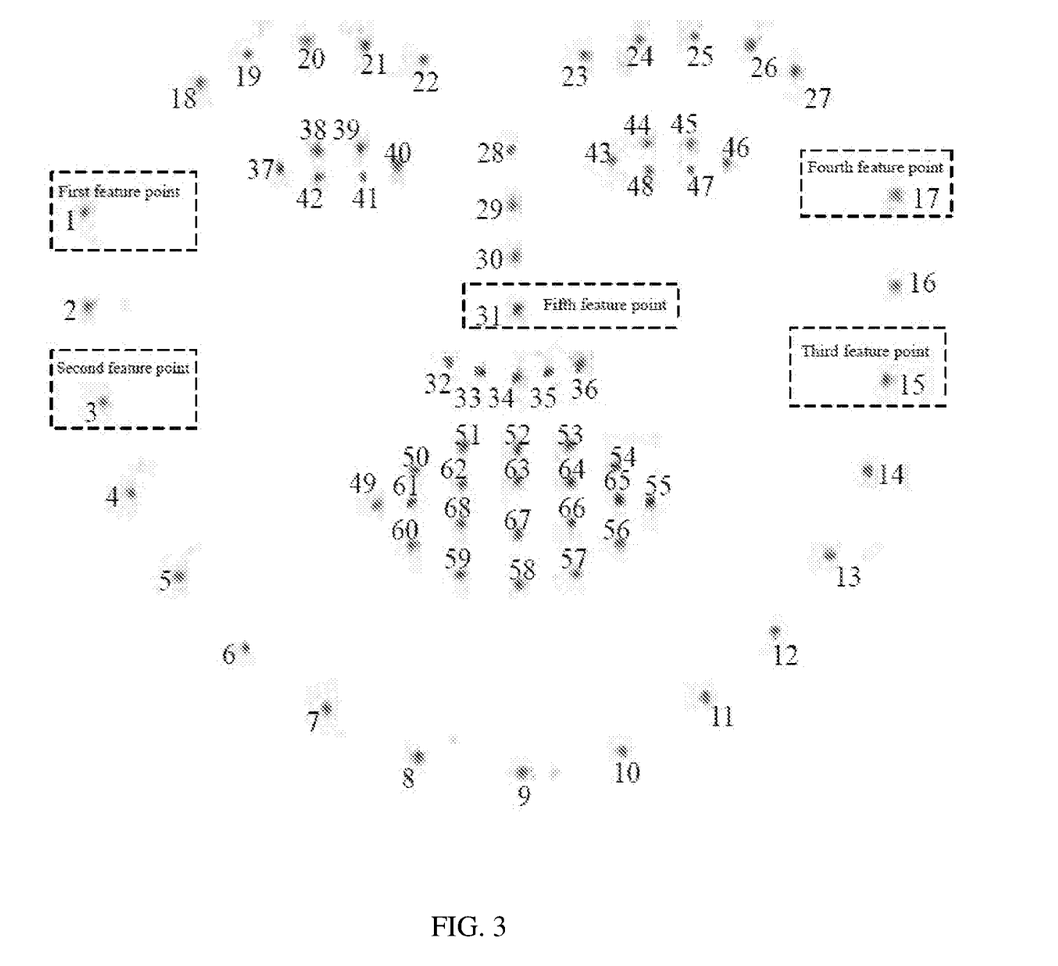
FIG. 3 is a schematic diagram of facial feature points extracted by the extraction module of FIG. 2.

The memory 12, which is a computer-readable storage medium, may include data such as real-time images and face images obtained by an operating system, a face pose detection program 10, and a camera device 11. The processor 13 executes the steps when executing the face pose detection program 10 stored in the memory 12:

face feature points extraction step: N individual face feature points are extracted from a face image through a face detection algorithm. As shown in FIG. 3, when the dlib face feature point detection algorithm is applied, the face feature points P1-P68 (N=68) can be extracted from the face image;

key feature points extraction step: extracting a first feature point P1 close to an upper part of a right ear, a second feature point P3 close to a lower part of the right ear, a third feature point P15 close to the lower part of a left ear and a fourth feature point P17 close to the upper part of the left ear among the facial contour feature points from the N face feature points, and extracting a nose tip feature point as a fifth feature point P31;

a first calculation step: forming a first vector by the fifth feature point P31 and the first feature point P1, forming a second vector by the fifth feature point P31 and the fourth feature point P17 (referring to FIG. 5), calculating a first included angle between the first vector and the second vector, and judging a rotation angle of a face around an X axis in the face image according to a change of the first included angle and an initial included angle;

a second calculation step: forming a third vector by the first feature point P1 and the fourth feature point P17, leading out a straight line L1 parallel to the X axis from the fourth feature point P17 (referring to FIG. 6), calculating a second included angle between the third vector and the straight line L1, and judging the rotation angle of a face around a Y axis in the face image according to the second included angle;

a third calculation step: recording the distance between the second feature point P3 and the fifth feature point P31 as a first distance, recording the distance between the third feature point P15 and the fifth feature point P31 as a second distance (referring to FIG. 7), calculating a ratio of the first distance to the second distance, and judging a rotation direction of the face around a Z axis in the face image according to the ratio of the first distance to the second distance.

Wherein the first calculation step includes:

calculating an initial included angle between the first vector and the second vector when the face is at an initial position, and optionally if the initial included angle is 120°, then:

when the first included angle is greater than 120°, it is indicated that a face in the face image rotates upwards around an X axis, wherein a rotation angle is the difference between the first included angle and the initial included angle;

when the first included angle is smaller than 120°, it is indicated that a face in the face image rotates downwards around an X axis, wherein a rotation angle is the difference between the initial included angle and the first included angle; and when the first included angle is equal to 120°, it is indicated that a face in the face image is at an initial position relative to an X axis, namely the head is not raised or lowered.

The second calculation step includes:

when the second included angle is 0°, it is indicated that a face in the face image is at an initial position relative to a Y axis, namely the head is not tilted leftwards or rightwards;

when the second included angle is not 0° and the first feature point is above the straight line L1, it is indicated that the face in the face image rotates left around the Y axis, and the rotation angle is the angle value of the second included angle; and when the second included angle is not 0° and the first feature point is below the straight line L1, it is indicated that the face in the face image rotates right around the Y axis, and the rotation angle is the angle value of the second included angle.

The third calculation step includes:

when the ratio of the first distance to the second distance is equal to 1, it is indicated that a face in the face image is at an initial position relative to the Z axis, namely the head is not turned left or right;

when the ratio of the first distance to the second distance is greater than 1, it is indicated that the face in the face image rotates left around a Z axis; and when the ratio of the first distance to the second distance is less than 1, it is indicated that the face in the face image rotates right around a Z axis.

In this embodiment, the face detection algorithm is a dlib face feature point detection algorithm. Referring to FIG. 3, a dlib face feature point detection algorithm is used for extracting 68 feature points from the face image, including 17 facial contour feature points, 10 eyebrow feature points, 4 nose wing feature points, including nose tip feature points, and 37 other nostril, eye and lip feature points. Among the facial contour feature points, the first feature point close to an upper part of a right ear is symmetrical with the fourth feature point close to the upper part of a left ear, and the second feature point close to a lower part of the right ear is symmetrical with the third feature point close to the lower part of the left ear.

The X, Y and Z coordinate axes are defined as: when a face is considered as a cylindrical surface, a central axis of the cylindrical surface is taken as a vertical coordinate axis Z axis of the face data, a straight line passing through a nose tip feature point and perpendicularly intersecting with the central axis of the cylindrical surface is taken as a Y axis, and a cross product direction of the Z axis and the Y axis is taken as an X axis.

In other embodiments, face pose detection program 10 may also be partitioned into one or more modules that are stored in memory 12 and executed by processor 13 to complete the present application. A module in this application refers to a series of computer program instruction segments capable of performing a particular function.

Figure 2:
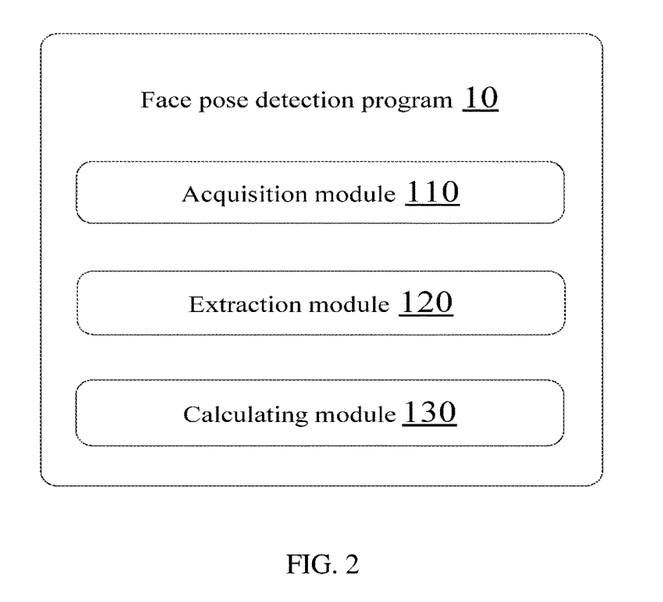
FIG. 2 is a functional block diagram of the face pose detection program of FIG. 1.

Referring to FIG. 2, a functional block diagram of the face pose detection program 10 of FIG. 1 is shown.

The face pose detection program 10 may be partitioned into an acquisition module 110, an extraction module 120, and a calculation module 130.

The acquisition module 110 is used for acquiring a real-time image captured by the camera device 11 and extracting a real-time face image from the real-time image by using a face recognition algorithm. When the camera device 11 captures a real-time image, it transmits the real-time image to the processor 13, and when the processor 13 receives the real-time image, the acquisition module 110 extracts the real-time face image using a face recognition algorithm.

Specifically, the face recognition algorithm for extracting a real-time face image from the real-time image may be a geometric feature-based method, a local feature analysis method, a feature face method, an elastic model-based method, a neural network method, etc.

The extraction module 120 is used for extracting the face feature points and the key feature points of the real-time face image.

For example, the extraction module 120 extracts 68 face feature points P1-P68 from the real-time face image via a dlib face feature point detection algorithm, as shown in FIG. 3. Furthermore, five key feature points are extracted from the 68 face feature points: a first feature point P1 close to an upper part of a right ear, a second feature point P3 close to a lower part of the right ear, a third feature point P15 close to the lower part of a left ear, a fourth feature point P17 close to the upper part of the left ear, and a fifth feature point P31 at the nose tip.

The calculation module 130 is used for calculating a rotation direction and angle of the face in the real-time face image according to the coordinate values of the five key feature points in the real-time face image.

Specifically, the calculation module 130 is used for:

calculating a first included angle of a first vector formed by the fifth feature point and the first feature point and a second vector formed by the fifth feature point and the fourth feature point, and judging the rotation angle of the face around an X axis in the face image according to a change of the first included angle and the initial included angle;

calculating a second included angle between a third vector formed by the first feature point and the fourth feature point and a straight line L1 parallel to the X axis and led out from the fourth feature point, so as to judge a rotation angle of the face around a Y axis in the face image; and calculating a ratio of the first distance of the second feature point and the fifth feature point to the second distance of the third feature point and the fifth feature point so as to judge the rotation direction of the face around a Z axis in the face image.

According to the calculating device 1 provided by the embodiment, the real-time face image is extracted from the real-time image, the face feature points are extracted from the real-time face image by utilizing the dlib face feature point detection algorithm. The key feature points are further extracted, and then the rotation direction and the rotation angle of the face in the face image are calculated according to the coordinate values of the key feature points, so that a real-time detection of the face pose is realized.

Figure 4:
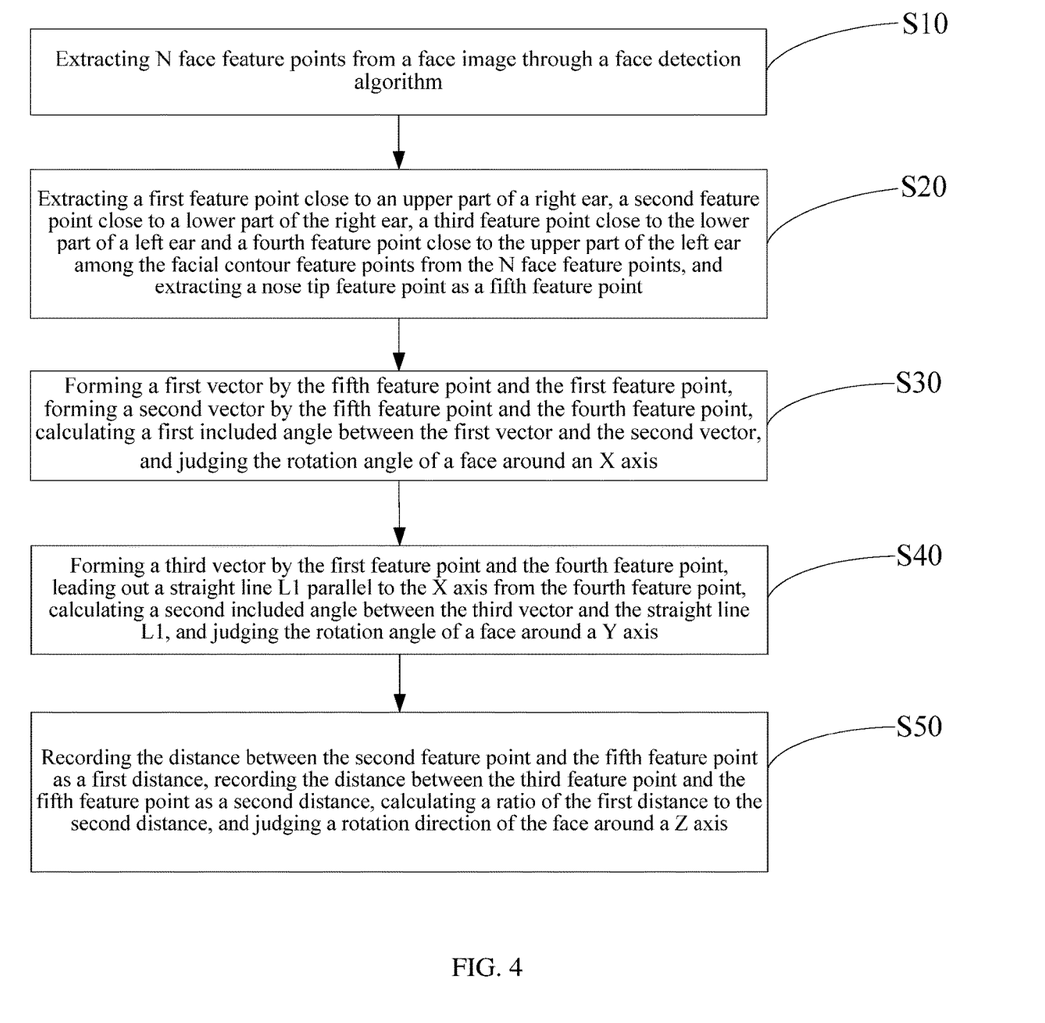
FIG. 4 is a flow chart of a preferred embodiment of the applicant's face pose detection method.

In addition, the invention also provides a face pose detection method. Referring to FIG. 4, a flow chart of a preferred embodiment of the applicant's face pose detection method is shown. The method may be performed by a calculating device, which may be implemented via software and/or hardware.

In the embodiment, the face pose detection method includes the steps of:

S10, N face feature points are extracted by the extraction module 120 from the face image through a face detection algorithm. A real-time image is captured by the camera device 11 and sent to the processor 13, after the real-time image is received by the processor 13, a real-time face image is extracted by using a face recognition algorithm, and then N face feature points are obtained through a face detection algorithm. Optionally, the face recognition algorithm by which the real-time face image is extracted from the real-time image may be a geometric feature-based method, a local feature analysis method, a feature face method, an elastic model-based method, a neural network method, etc. Preferably, the face detection algorithm for extracting face feature points from the face image is a dlib face feature point detection algorithm.

Step S20, key feature points are extracted by the extraction module 120 from the feature points of the face image. A first feature point P1 close to an upper part of a right ear, a second feature point P3 close to a lower part of the right ear, a third feature point P15 close to the lower part of a left ear, and a fourth feature point P17 close to the upper part of the left ear are further extracted by the extraction module 120, and a nose tip feature point is extracted as a fifth feature point P31.

Figure 5:
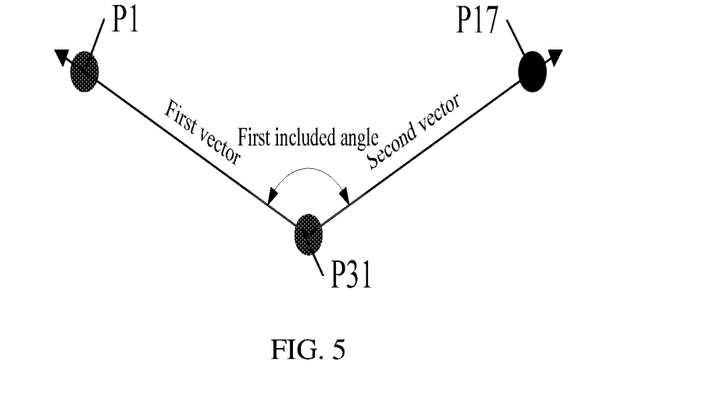
FIG. 5 is a schematic diagram of the feature points, vectors, and included angles involved in step S30 of FIG. 4.
Figure 6:
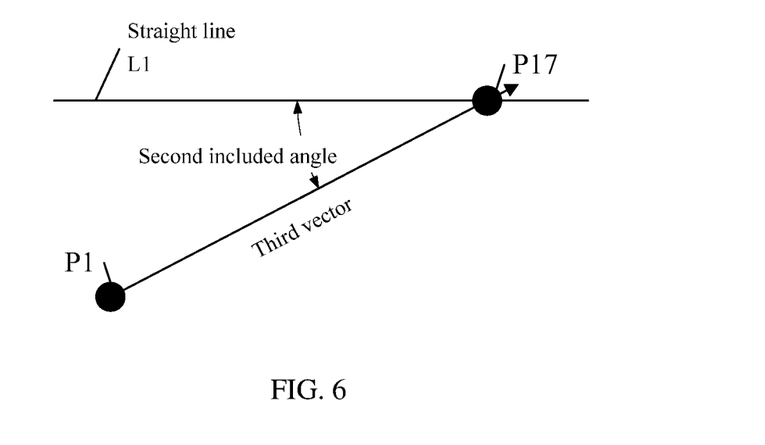
FIG. 6 is a schematic diagram of feature points, vectors, lines, and included angles involved in step S40 of FIG. 4.

Step S30, a rotation angle of a face around an X axis in the face image is calculated by the calculation module 130. Referring to FIG. 5, a first vector is formed by the fifth feature point P31 and the first feature point P1, a second vector is formed by the fifth feature point P31 and the fourth feature point P17, a first included angle between the first vector and the second vector is calculated, and the rotation angle of the face around the X axis in the face image is judged according to the change of the first included angle and the initial included angle;

Step S40, a rotation angle of a face around a Y axis in the face image is calculated by the calculation module 130. Referring to FIG. 6, a third vector is formed by the first feature point P1 and the fourth feature point P17, a straight line L1 parallel to the X axis is led out from the fourth feature point P17, a second included angle between the third vector and the straight line L1 is calculated, and the rotation angle of a face around a Y axis in the face image is judged according to the second included angle.

Figure 7:
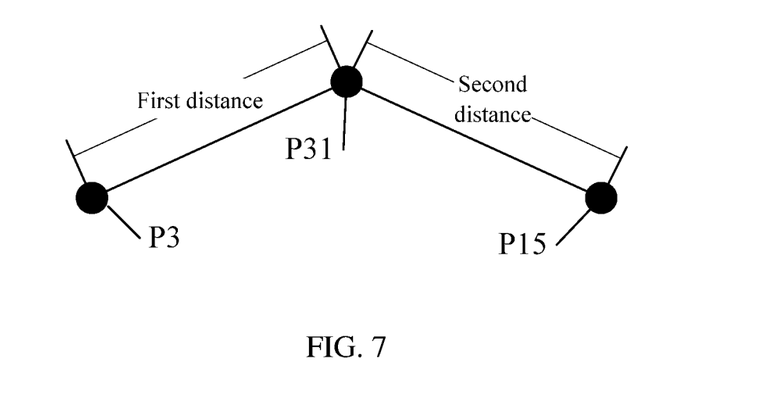
FIG. 7 is a schematic diagram of feature points and distances between feature points involved in step S50 of FIG. 4.

Step S50, a rotation direction of a face around a Z axis in the face image is calculated by the calculation module 130. Referring to FIG. 7, the distance between the second feature point P3 and the fifth feature point P31 is recorded as a first distance, the distance between the third feature point P15 and the fifth feature point P31 is recorded as a second distance, a ratio of the first distance to the second distance is calculated, and the rotation direction of the face around a Z axis according to the ratio of the first distance to the second distance is judged.

According to the face pose detection method provided by the embodiment, the dlib face feature point detection algorithm is utilized to obtain the face feature points in the real-time face image, key feature points are further extracted, a rotation direction and a rotation angle of a face in the real-time face image are calculated according to the coordinate values of the key feature points, and a real-time detection of the face pose is realized.

In addition, the embodiment of the invention also provides a computer-readable storage medium which includes a face pose detection program, and the following operations are realized when the face pose detection program is executed by the processor:

face feature points extraction step: N individual face feature points are extracted from a face image through a face detection algorithm. As shown in FIG. 3, when the dlib face feature point detection algorithm is applied, the face feature points P1-P68 (N=68) can be extracted from the face image;

key feature points extraction step: a first feature point P1 close to an upper part of a right ear, a second feature point P3 close to a lower part of the right ear, a third feature point P15 close to the lower part of a left ear and a fourth feature point P17 close to the upper part of the left ear among the facial contour feature points are extracted from the N face feature points, and a nose tip feature point is extracted as a fifth feature point P31;

a first calculation step: a first vector is formed by the fifth feature point P31 and the first feature point P1, a second vector is formed by the fifth feature point P31 and the fourth feature point P17 (referring to FIG. 5), a first included angle between the first vector and the second vector is calculated, and a rotation angle of a face around an X axis in the face image is judged according to a change of the first included angle and the initial included angle;

a second calculation step: a third vector is formed by the first feature point P1 and the fourth feature point P17, a straight line L1 parallel to the X axis is led out from the fourth feature point P17 (referring to FIG. 6), a second included angle between the third vector and the straight line L1 is calculated, and a rotation angle of a face around a Y axis in the face image according to the second included angle is judged;

a third calculation step: the distance between the second feature point P3 and the fifth feature point P31 is recorded as a first distance, the distance between the third feature point P15 and the fifth feature point P31 is recorded as a second distance (see FIG. 7), a ratio of the first distance to the second distance is calculated, and a rotation direction of the face around a Z axis in the face image is judged according to the ratio of the first distance to the second distance.

Wherein the first calculation step includes:

an initial included angle between the first vector and the second vector is calculated when the face is at an initial position, and if the initial included angle is 120°, then:

when the first included angle is greater than 120°, it is indicated that a face in the face image rotates upwards around an X axis, wherein a rotation angle is the difference between the first included angle and the initial included angle;

when the first included angle is smaller than 120°, it is indicated that a face in the face image rotates downwards around an X axis, wherein the rotation angle is the difference between the initial included angle and the first included angle; and when the first included angle is equal to 120°, it is indicated that the face in the face image is at an initial position relative to the X axis, namely the head is not raised or lowered.

The second calculation step includes:

when the second included angle is 0°, it is indicated that the face in the face image is at an initial position relative to a Y axis, namely the head is not tilted leftwards or rightwards;

when the second included angle is not 0° and the first feature point is above the straight line L1, it is indicated that the face in the face image rotates left around the Y axis, and the rotation angle is the angle value of the second included angle; and when the second included angle is not 0° and the first feature point is below the straight line L1, it is indicated that the face in the face image rotates right around the Y axis, and the rotation angle is the angle value of the second included angle.

The third calculation step includes:

when the ratio of the first distance to the second distance is equal to 1, it is indicated that the face in the face image is at an initial position relative to a Z axis, namely the head is not turned left or right;

when the ratio of the first distance to the second distance is greater than 1, it is indicated that the face in the face image rotates left around the Z axis; and when the ratio of the first distance to the second distance is less than 1, it is indicated that the face in the face image rotates right around the Z axis.

Embodiments of the computer-readable storage medium for face pose detection of the present application are substantially the same as the embodiments of the face pose detection method described above and will not be described in detail herein.

It should be noted that the terms "includes, including", or any other variation thereof, are intended to cover a non-exclusive inclusion, such that a process, apparatus, article, or method that includes a list of elements does not include only those elements but may include other elements not expressly listed or inherent to such process, apparatus, or method. An element defined by the phrase "includes a" does not preclude additional identical elements in the process, apparatus, or method that includes the element without more constraints.

The above embodiments of the present application are by way of illustration only and do not represent advantages or disadvantages of the embodiments. From the above description of the embodiments, it will be clear to a person skilled in the art that the method according to the above embodiment can be implemented by means of software plus the necessary general-purpose hardware platform, but in many cases the former is a better implementation. Understood as above, the technical solution of the present application, in essence or in part contributing to the prior art, may be embodied in the form of a software product stored in a storage medium (e.g., ROM/RAM, diskette, optical disk) as described above, including instructions for causing a terminal device (which may be a cell phone, computer, server, network device, etc.) to perform the methods described in the various embodiments of the present application.

The foregoing is merely a preferred embodiment of the present application and is not intended to limit the scope of the present application, for example, the equivalent structures or equivalent processes shown in the specification and drawings may be utilized directly or indirectly in other related fields of technology, and all equivalents are intended to be included within the scope of the present application.

What is claimed is:

1. A face pose detection method, the method comprising the steps of:
   face feature points extraction step: extracting N face feature points from a face image through a face detection algorithm;
   key feature points extraction step: extracting a first feature point close to an upper part of a right ear, a second feature point close to a lower part of the right ear, a third feature point close to the lower part of a left ear and a fourth feature point close to the upper part of the left ear among facial contour feature points from the N face feature points, and extracting a nose tip feature point as a fifth feature point;
   a first calculation step: forming a first vector by the fifth feature point and the first feature point, forming a second vector by the fifth feature point and the fourth feature point, calculating a first included angle between the first vector and the second vector, and judging a rotation angle of a face around an X axis in the face image according to a change of the first included angle and an initial included angle;
   a second calculation step: forming a third vector by the first feature point and the fourth feature point, leading out a straight line L1 parallel to the X axis from the fourth feature point, calculating a second included angle between the third vector and the straight line L1, and judging the rotation angle of a face around a Y axis in the face image according to the second included angle; and
   a third calculation step: recording a distance between the second feature point and the fifth feature point as a first distance, recording the distance between the third feature point and the fifth feature point as a second distance, calculating a ratio of the first distance to the second distance, and judging a rotation direction of the face around a Z axis in the face image according to the ratio of the first distance to the second distance.

2. The face pose detection method according to claim 1, wherein the face detection algorithm is a dlib face feature point detection algorithm.

3. The face pose detection method according to claim 1, wherein the N face feature points comprise a facial contour feature point, an eyebrow feature point, a nose wing feature point, a nostril feature point, an eye feature point, and a lip feature point.

4. The face pose detection method according to claim 1, wherein the first feature point close to the upper part of the right ear is symmetric with the fourth feature point close to the upper part of the left ear and the second feature point close to the lower part of the right ear is symmetric with the third feature point close to the lower part of the left ear.

5. The face pose detection method according to claim 1, wherein the first calculation step comprises:
   calculating an initial included angle between the first vector and the second vector when the face is at an initial position;

wherein, when the first included angle is greater than the initial included angle, it is indicated that the face in the face image rotates upwards around the X axis, and the rotation angle is the difference between the first included angle and the initial included angle;

when the first included angle is smaller than the initial included angle, it is indicated that the face in the face image rotates downwards around the X axis, and the rotation angle is the difference between the initial included angle and the first included angle; and when the first included angle is equal to the initial included angle, it is indicated that the face in the face image is at the initial position relative to the X axis.

6. The face pose detection method according to claim 1, wherein the second calculation step comprises:

when the second included angle is 0°, it is indicated that the face in the face image is at an initial position relative to the Y axis;

when the second included angle is not 0° and the first feature point is above the straight line L1, it is indicated that the face in the face image rotates left around the Y axis, and the rotation angle is an angle value of the second included angle; and when the second included angle is not 0° and the first feature point is below the straight line L1, it is indicated that the face in the face image rotates right around the Y axis, and the rotation angle is the angle value of the second included angle.

7. The face pose detection method according to claim 1, wherein the third calculation step comprises:

when the ratio of the first distance to the second distance is equal to 1, it is indicated that the face in the face image is at an initial position relative to the Z axis;

when the ratio of the first distance to the second distance is greater than 1, it is indicated that the face in the face image rotates left around the Z axis; and when the ratio of the first distance to the second distance is less than 1, it is indicated that the face in the face image rotates right around the Z axis.

8. A calculating device, comprising a camera device, a memory and a processor, the memory comprising a face pose detection program, wherein, the following steps are realized when the face pose detection program is executed by the processor:

face feature points extraction step: extracting N face feature points from a face image through a face detection algorithm;

key feature points extraction step: extracting a first feature point close to an upper part of a right ear, a second feature point close to a lower part of the right ear, a third feature point close to the lower part of a left ear and a fourth feature point close to the upper part of the left ear among facial contour feature points from the N face feature points, and extracting a nose tip feature point as a fifth feature point;

a first calculation step: forming a first vector by the fifth feature point and the first feature point, forming a second vector by the fifth feature point and the fourth feature point, calculating a first included angle between the first vector and the second vector, and judging a rotation angle of a face around an X axis in the face image according to a change of the first included angle and an initial included angle;

a second calculation step: forming a third vector by the first feature point and the fourth feature point, leading out a straight line L1 parallel to the X axis from the fourth feature point, calculating a second included angle between the third vector and the straight line L1, and judging the rotation angle of a face around a Y axis in the face image according to the second included angle;

a third calculation step: recording a distance between the second feature point and the fifth feature point as a first distance, recording the distance between the third feature point and the fifth feature point as a second distance, calculating a ratio of the first distance to the second distance, and judging a rotation direction of the face around a Z axis in the face image according to the ratio of the first distance to the second distance.

9. The calculating device according to claim 8, wherein the face detection algorithm is a dlib face feature point detection algorithm.

10. The calculating device according to claim 8, wherein the N face feature points comprises a facial contour feature point, an eyebrow feature point, a nose wing feature point, a nostril feature point, an eye feature point, and a lip feature point.

11. The calculating device according to claim 8, wherein among the facial contour feature points, a first feature point close to the upper part of the right ear is symmetric with a fourth feature point close to the upper part of the left ear, and a second feature point close to the lower part of the right ear is symmetric with a third feature point close to the lower part of the left ear.

12. The calculating device according to claim 8, wherein the first calculation step comprises:

calculating an initial included angle between the first vector and the second vector when the face is at an initial position;

wherein, when the first included angle is greater than the initial included angle, it is indicated that the face in the face image rotates upwards around the X axis, and the rotation angle is the difference between the first included angle and the initial included angle;

when the first included angle is smaller than the initial included angle, it is indicated that the face in the face image rotates downwards around the X axis, and the rotation angle is the difference between the initial included angle and the first included angle; and when the first included angle is equal to the initial included angle, it is indicated that the face in the face image is at the initial position relative to the X axis.

13. The calculating device according to claim 8, wherein the second calculation step comprises:

when the second included angle is 0°, it is indicated that the face in the face image is at the initial position relative to the Y axis;

when the second included angle is not 0° and the first feature point is above the straight line L1, it is indicated that the face in the face image rotates left around the Y axis, and the rotation angle is an angle value of the second included angle; and when the second included angle is not 0° and the first feature point is below the straight line L1, it is indicated that the face in the face image rotates right around the Y axis, and the rotation angle is the angle value of the second included angle.

14. The calculating device according to claim 8, wherein the third calculation step comprises:

when the ratio of the first distance to the second distance is equal to 1, it is indicated that the face in the face image is at the initial position relative to the Z axis;

when the ratio of the first distance to the second distance is greater than 1, it is indicated that the face in the face image rotates left around the Z axis; and when the ratio of the first distance to the second distance is less than 1, it is indicated that the face in the face image rotates right around the Z axis.

15. A non-transitory computer-readable storage medium, the computer-readable storage medium comprising a face pose detection program, wherein, the following steps are realized when a face pose detection program is executed by the processor:

face feature points extraction step: extracting N face feature points from a face image through a face detection algorithm;

key feature points extraction step: extracting a first feature point close to an upper part of a right ear, a second feature point close to a lower part of the right ear, a third feature point close to the lower part of a left ear and a fourth feature point close to the upper part of the left ear among facial contour feature points from the N face feature points, and extracting a nose tip feature point as a fifth feature point;

a first calculation step: forming a first vector by the fifth feature point and the first feature point, forming a second vector by the fifth feature point and the fourth feature point, calculating a first included angle between the first vector and the second vector, and judging a rotation angle of a face around an X axis in the face image according to a change of the first included angle and an initial included angle;

a second calculation step: forming a third vector by the first feature point and the fourth feature point, leading out a straight line L1 parallel to the X axis from the fourth feature point, calculating a second included angle between the third vector and the straight line L1, and judging the rotation angle of a face around a Y axis in the face image according to the second included angle;

a third calculation step: recording a distance between the second feature point and the fifth feature point as a first distance, recording the distance between the third feature point and the fifth feature point as a second distance, calculating a ratio of the first distance to the second distance, and judging a rotation direction of the face around a Z axis in the face image according to the ratio of the first distance to the second distance.

16. The non-transitory computer-readable storage medium according to claim 15, wherein the face detection algorithm is a dlib face feature point detection algorithm;

the N face feature points comprise a facial contour feature point, an eyebrow feature point, a nose wing feature point, a nostril feature point, an eye feature point and a lip feature point.

17. The non-transitory computer-readable storage medium according to claim 15, wherein among the facial contour feature points, a first feature point close to the upper part of the right ear is symmetric with the fourth feature point close to the upper part of the left ear, and a second feature point close to the lower part of the right ear is symmetric with the third feature point close to the lower part of the left ear.

18. The non-transitory computer-readable storage medium according to claim 15, wherein the first calculation step comprises:

calculating an initial included angle between the first vector and the second vector when the face is at an initial position;

wherein, when the first included angle is greater than the initial included angle, it is indicated that the face in the face image rotates upwards around the X axis, and the rotation angle is the difference between the first included angle and the initial included angle;

when the first included angle is smaller than the initial included angle, it is indicated that the face in the face image rotates downwards around the X axis, and the rotation angle is the difference between the initial included angle and the first included angle; and when the first included angle is equal to the initial included angle, it is indicated that the face in the face image is at the initial position relative to the X axis.

19. The non-transitory computer-readable storage medium according to claim 15, wherein the second calculation step comprises:

when the second included angle is 0°, it is indicated that the face in the face image is at the initial position relative to the Y axis;

wherein, when the second included angle is not 0° and the first feature point is above the straight line L1, it is indicated that the face in the face image rotates left around the Y axis, and the rotation angle is an angle value of the second included angle; and when the second included angle is not 0° and the first feature point is below the straight line L1, it is indicated that the face in the face image rotates right around the Y axis, and the rotation angle is the angle value of the second included angle.

20. The non-transitory computer-readable storage medium according to claim 15, wherein the third calculation step comprises:

when the ratio of the first distance to the second distance is equal to 1, it is indicated that the face in the face image is at the initial position relative to the Z axis;

when the ratio of the first distance to the second distance is greater than 1, it is indicated that the face in the face image rotates left around the Z axis; and when the ratio of the first distance to the second distance is less than 1, it is indicated that the face in the face image rotates right around the Z axis.

* * * * *